United States Patent
Yao et al.

(10) Patent No.: US 12,444,481 B2
(45) Date of Patent: Oct. 14, 2025

(54) DATA-ANALYZING METHOD, DATA-ANALYZING DEVICE, AND SAMPLE ANALYZER

(71) Applicants: SHIMADZU CORPORATION, Kyoto (JP); KWANSEI GAKUIN EDUCATIONAL FOUNDATION, Nishinomiya (JP)

(72) Inventors: Ikuko Yao, Sanda (JP); Yuzuki Morita, Nagoya (JP); Shinichi Yamaguchi, Kyoto (JP)

(73) Assignees: SHIMADZU CORPORATION, Kyoto (JP); KWANSEI GAKUIN EDUCATIONAL FOUNDATION, Nishinomiya (JP)

( * ) Notice: Subject to any disclaimer, the term of this patent is extended or adjusted under 35 U.S.C. 154(b) by 435 days.

(21) Appl. No.: 17/989,906

(22) Filed: Nov. 18, 2022

(65) Prior Publication Data

US 2023/0335221 A1    Oct. 19, 2023

(30) Foreign Application Priority Data

Apr. 14, 2022    (JP) ................ 2022-066756

(51) Int. Cl.
*G16B 40/10* (2019.01)
*G16B 40/30* (2019.01)
(Continued)

(52) U.S. Cl.
CPC ............ *G16B 40/10* (2019.02); *G16B 40/30* (2019.02); *H01J 49/0004* (2013.01); *H01J 49/0036* (2013.01); *H01J 49/164* (2013.01)

(58) Field of Classification Search
None
See application file for complete search history.

(56) References Cited

FOREIGN PATENT DOCUMENTS

| JP | 4973360 B2 | 7/2012 | |
| JP | 2020184312 A | * 11/2020 | ............. G06F 17/18 |
| WO | 2021/130840 A1 | 7/2021 | |

OTHER PUBLICATIONS

English machine translation of JP 2020184312 A (Year: 2020).*
(Continued)

*Primary Examiner* — Walter L Lindsay, Jr.
*Assistant Examiner* — Geoffrey T Evans
(74) *Attorney, Agent, or Firm* — Sughrue Mion, PLLC

(57) ABSTRACT

In a data-analyzing method in which an analysis based on a plurality of data groups each obtained by an instrumental analysis on each of a plurality of samples, with each data group including signal values having an n-dimensional array structure (where n≥2), is performed by using a computer, to obtain desired information concerning a difference between the samples, the method includes: a computational processing step for performing, in each data group, a persistent-homology processing on data including signal values having an m-dimensional array structure (where 2≤m≤n) obtained from one data group, to create a persistence diagram (PD); and an analytical processing step for comparing PDs respectively obtained from the data groups, to obtain the desired information based on a difference in the dispersion state of plots across the entire PDs being compared and/or based on information concerning a plot having no positional correspondence determined on the PDs being compared.

12 Claims, 8 Drawing Sheets
(3 of 8 Drawing Sheet(s) Filed in Color)

(51) Int. Cl.
    *H01J 49/00*    (2006.01)
    *H01J 49/16*    (2006.01)

(56) References Cited

OTHER PUBLICATIONS

Hiroaki Hiraoka et al., "Persistent Homology and Its Applications to Materials Science", Materia Japan, 2019, vol. 58, No. 1.

Fukumizu, "Paashisutento-zu Ni Taisuru Toukeiteki Kikai Gakushuu (Statistical Machine Learning on Persistence Diagram)", [online], [accessed on Feb. 24, 2022], The Institute of Statistical Mathematics, Chuo University, the Internet <URL: https://www.math.chuou.ac.jp/ENCwMATH/EwM70_Fukumizu.pdf >.

Xiyu Ouyang et al., "Comprehensive two-dimensional liquid chromatography coupled to high resolution time of flight mass spectrometry for chemical characterization of sewage treatment plant effluents", Journal of Chromatography A, 2015, pp. 139-145, vol. 1380.

Nikita Prianichnikov et al., "MaxQuant Software for Ion Mobility Enhanced Shotgun Proteomics", Molecular & Cellular Proteomics, 2020, pp. 1058-1069, vol. 19.

\* cited by examiner

Fig. 6
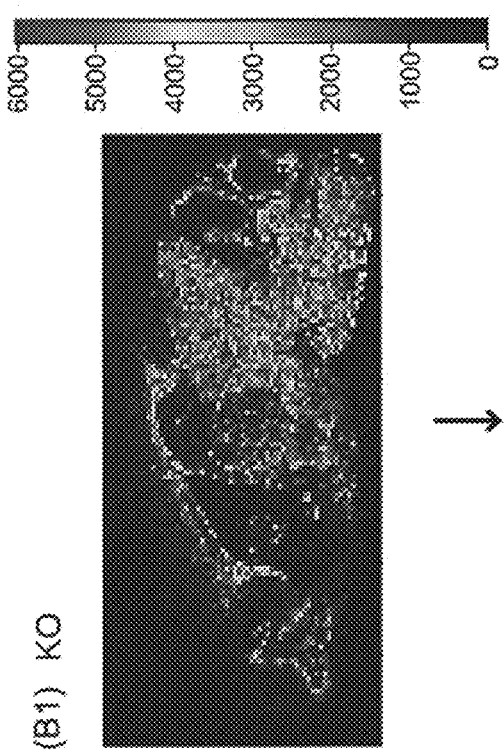  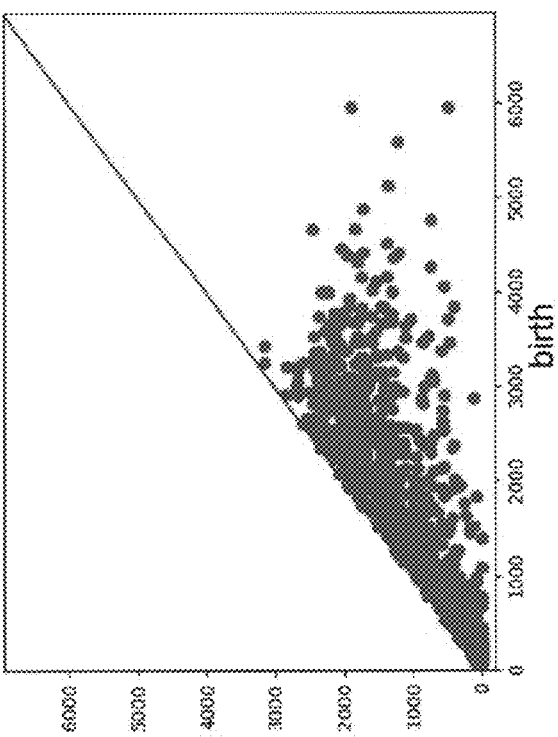
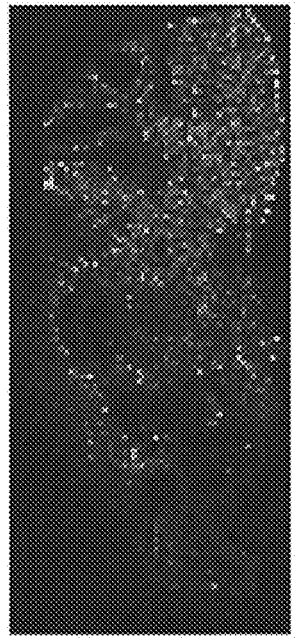  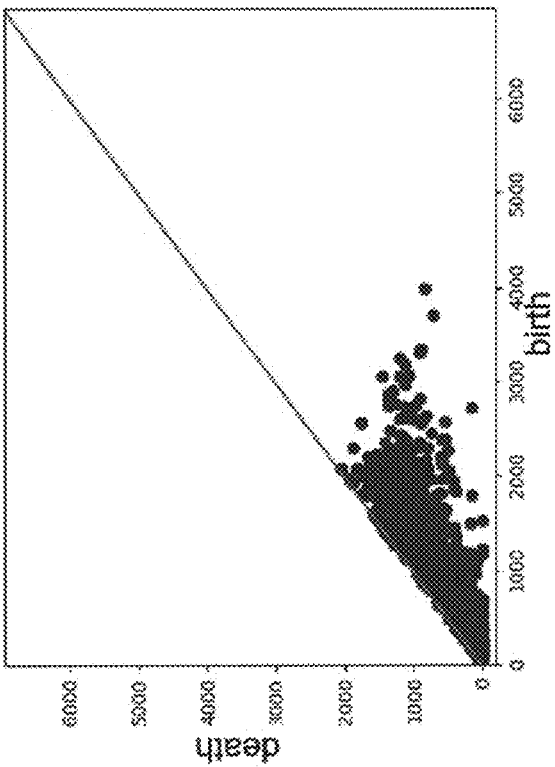

DATA-ANALYZING METHOD, DATA-ANALYZING DEVICE, AND SAMPLE ANALYZER

TECHNICAL FIELD

The present invention relates to a data-analyzing method and data-analyzing device for instrumental analysis, as well as a sample analyzer using the data-analyzing device.

BACKGROUND ART

As one type of mass spectrometer, imaging mass spectrometers described in Patent Literature 1 or other related documents have been commonly known. An imaging mass spectrometer includes an ion source employing a matrix assisted laser desorption/ionization (MALDI) method or similar techniques. It allows a user to observe the morphology of fine tissues or other structures on the surface of a sample, such as a biological tissue section, and collect a set of mass spectrum data over a predetermined range of mass-to-charge ratios (m/z) from each of the micro areas defined by finely dividing a desired two-dimensional area on the sample.

Another method for imaging mass spectrometry has also been commonly known in which a sample collection method called the "laser micro dissection" is used to obtain a piece of sample from each of a large number of micro areas within a desired two-dimensional area on a sample. A liquid sample is prepared from each piece of sample and subjected to a mass spectrometric analysis to obtain mass spectrum data for each micro area (for example, see Patent Literature 2).

In any of the aforementioned methods, a graphic image showing the distribution state of a specific kind of compound is obtained from the sets of mass spectrum data respectively acquired from the micro areas on a sample (this type of image may hereinafter be called an "MS imaging graphic," or simply an "imaging graphic", while the sets of mass spectrum data acquired from one sample may hereinafter be collectively called the "MS imaging data"). For example, an MS imaging graphic can be created by extracting signal intensity values at the m/z value of an ion originating from a specific kind of compound and two-dimensionally arranging those signal intensity values according to the positions of the corresponding micro areas on the sample.

CITATION LIST

Patent Literature

Patent Literature 1: JP 4973360 B
Patent Literature 2: WO 2021/130840 A

Non Patent Literature

Non Patent Literature 1: Hiraoka and Obayashi, "Persistent Homology and Its Applications to Materials Science", *Materia Japan*, Vol. 58, No. 1, 2019
Non Patent Literature 2: Fukumizu, "Paashisutento-zu Ni Taisuru Toukei-teki Kikai Gakushuu (Statistical Machine Learning on Persistence Diagram)", [online], [accessed on Feb. 24, 2022], The Institute of Statistical Mathematics, Chuo University, the Internet
Non Patent Literature 3: Xiyu Ouyang and five other authors, "Comprehensive two-dimensional liquid chromatography coupled to high resolution time of flight mass spectrometry for chemical characterization of sewage treatment plant effluents", Journal of Chromatography A, 1380, 2015, pp.139-145
Non Patent Literature 4: Nikita Prianichnikov, and seven other authors, "MaxQuant Software for Ion Mobility Enhanced Shotgun Proteomics", *Molecular & Cellular Proteomics,* 19, 2020, pp.1058-1069

SUMMARY OF INVENTION

Technical Problem

In an analysis using an imaging mass spectrometer, a differential analysis is often performed, which is an analysis in which, for example, a section sample taken from an internal organ of a healthy individual of an experimental animal and one taken from the same kind of internal organ of a diseased individual of the same kind of experimental animal are compared with each other to determine their difference. It is often the case that two section samples taken from different individuals for comparison are considerably different from each other in size and/or shape even when those samples have been taken from the same kind of internal organ.

Section samples taken from different locations in the same internal organ may also be compared, in which case those section samples are often different from each other in size and/or shape when their locations are different. When comparing a plurality of MS imaging graphics obtained through measurements of a plurality of section samples which are different from each other in size and/or shape in this manner, an individual in charge of the analysis (this individual may hereinafter be called an "operator") visually compares those graphics for evaluation, or alternatively, as described in Patent Literature 1, an analysis is performed in which one or both of the MS imaging graphics are subjected to an image-deforming process which makes the two graphics match with each other in size and/or shape of the sample, and the same position on the two graphics is examined to determine whether or not there is a difference at that position between the two images.

Since one MS imaging graphic is obtained for each m/z value, the number of graphics is normally huge. Therefore, it is considerably difficult and extremely burdensome for the operator to visually compare a plurality of MS imaging graphics for each m/z value. Furthermore, only a limited number of operators can take charge of the visual analysis since the accuracy of this task depends on the operator's skill, experience and other personal factors. Furthermore, the result of the analysis inevitably varies from one operator to another, making it difficult to quantitatively evaluate the result.

In the case of performing the image-deforming process for changing the size and/or shape of the MS imaging graphics before the differential analysis, a considerable amount of time and labor is required for the task since the image-deforming process must be performed on a huge number of images. Even when the contours of the samples have been made to roughly match with each other by the image-deforming process, it is extremely difficult to achieve exact matching of the positions of the detailed internal biological structures within the images. Therefore, it is difficult to perform the differential analysis with a sufficient level of accuracy and reliability even when the significant amount of time and labor is used.

Thus, in the present circumstances, it is difficult to efficiently perform an analysis which includes the task of comparing a plurality of MS imaging graphics respectively obtained from a plurality of samples. In particular, there has been a demand for the establishment of a technique for efficiently and precisely performing a differential analysis between a plurality of images without being substantially affected by the variation in the position of the sites to be compared among the plurality of images.

Needless to say, this type of problem is not limited to the data analysis in an imaging mass spectrometer. A similar problem also occurs in an imaging analysis which employs an optical technique, such as Raman spectroscopy or Fourier transform infrared spectroscopy (FTIR).

The present invention has been developed to solve the previously described problem. One of its objectives is to provide a data-analyzing method and data-analyzing device by which an analysis of a difference between samples (or the like) can be efficiently performed for MS imaging graphics respectively obtained from samples that are different from each other in size and/or shape for example, without requiring an image-deforming process for making the MS imaging graphics match with each other in size and/or shape of the sample, and without requiring an operator to perform the task of visually comparing the MS imaging graphics. The present invention also provides a sample analyzer employing such a data-analyzing device.

Solution to Problem

One mode of the data-analyzing method for instrumental analysis according to the present invention developed for solving the previously described problem is a data-analyzing method for instrumental analysis in which a data analysis based on a plurality of data groups each obtained by performing a predetermined instrumental analysis on each of a plurality of samples, with each of the plurality of data groups including signal values having an n-dimensional array structure (where n is an integer equal to or greater than two), is performed by using a computer, to obtain desired information concerning a difference between the plurality of samples, the method including:

a computational processing step for performing, in each of the plurality of data groups, a persistent-homology processing on data including signal values having an m-dimensional array structure (where m is an integer equal to or greater than two and equal to or less than n) obtained from one data group, to create a persistence diagram; and an analytical processing step for comparing persistence diagrams respectively obtained from the plurality of data groups with each other, to obtain the desired information based on a difference in the dispersion state of plots across the entire persistence diagrams being compared and/or based on information concerning a plot having no positional correspondence determined on the persistence diagrams being compared.

One mode of the data-analyzing device according to the present invention developed for solving the previously described problem is a data-analyzing device for instrumental analysis in which a data analysis based on a plurality of data groups each obtained by performing a predetermined instrumental analysis on each of a plurality of samples, with each of the plurality of data groups including signal values having an n-dimensional array structure (where n is an integer equal to or greater than two), is performed to obtain desired information concerning a difference between the plurality of samples, the data-analyzing device including:

a computational processor configured to perform, in each of the plurality of data groups, a persistent-homology processing on data including signal values having an m-dimensional array structure (where m is an integer equal to or greater than two and equal to or less than n) obtained from one data group, to create a persistence diagram; and an analytical processor configured to compare persistence diagrams respectively obtained from the plurality of data groups with each other to obtain the desired information based on a difference in the dispersion state of plots across the entire persistence diagrams being compared, and/or information concerning a plot having no positional correspondence determined on the persistence diagrams being compared.

One mode of the sample analyzer according to the present invention developed for solving the previously described problem is a sample analyzer employing the previously described mode of the data-analyzing device for instrumental analysis according to the present invention, the sample analyzer further including a measurement executer configured to obtain each of a plurality of data groups by performing a predetermined instrumental analysis on each of a plurality of samples, with each of the plurality of data groups including signal values having an n-dimensional array structure (where n is an integer equal to or greater than two).

Advantageous Effects of Invention

The MS imaging data mentioned earlier is one example of the data group having an n-dimensional array structure. In that case, the number of dimensions is three, i.e., n=3, of which two dimensions are position information in two different directions on a sample, while the remaining dimension is m/z-value information.

As will be detailed later, the persistent homology, which is a technique for topological data analysis, is a technique which extracts a feature quantity by focusing on structural elements in a two-dimensional or three-dimensional image. The feature quantity is barely affected by the position, orientation or other properties of an object within the image. Therefore, according to any of the previously described modes of the present invention, a data analysis concerning a difference between samples, such as an analysis for identifying a compound showing a significant difference in distribution state between samples or for localizing a site showing a significant difference in the abundance of a specific kind of compound, can be efficiently performed with a satisfactory level of accuracy for MS imaging graphics respectively obtained from samples that are different from each other in size and/or shape for example, without requiring an image-deforming process for making the MS imaging graphics match with each other in size and/or shape of the sample, and without requiring an operator to perform the task of visually comparing the MS imaging graphics.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 6 show an example of the MS imaging graphics (A1) and (B1) for a wild-type (WT) sample and a genetically modified (KO) sample as well as persistence diagrams (A2) and (B2) respectively calculated from those graphics.

DESCRIPTION OF EMBODIMENTS

[Illustrative Explanation of Previously Described Modes]

Figure 1:
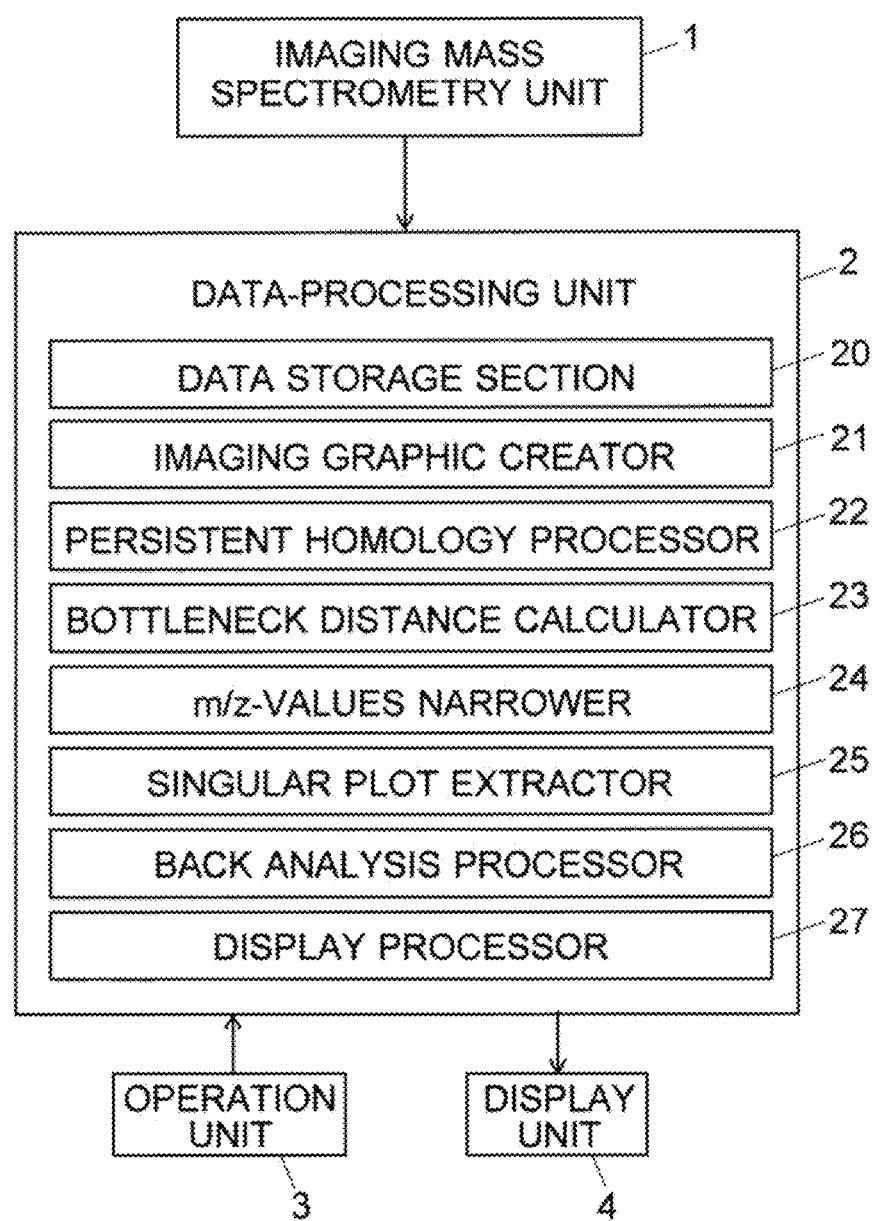
FIG. 1 is a schematic configuration diagram of an imaging mass spectrometer as one embodiment of a sample analyzer according to the present invention.

In the previously described modes of the present invention, the "predetermined instrumental analysis" may be any technique that allows for the acquisition of data groups each including "signal values having an n-dimensional array structure" as a result of an analysis (or instrumentation or measurement) on a sample.

As a matter of course, the "signal value" in the present context may be a signal intensity value obtained by an instrumental analysis, or it may be a data value derived from a signal intensity value by various calculations. Accordingly, for example, the "signal value" may be a corrected value obtained by correcting a signal intensity value, or it may also be a quantitatively determined value, such as a concentration value or a content.

The "signal value having an n-dimensional array structure" means that the signal value is related to n kinds of parameters each of which is a variable having a predetermined numerical range. There are various kinds of possible parameters depending on the technique of the instrumental analysis, the examples of which include position, time, wavelength, wavenumber, mass-to-charge ratio, energy, voltage, current and temperature.

For example, when the technique of the instrumental analysis is imaging mass spectrometry, n equals three and there are three dimensions, of which two dimensions are position information in two different directions on a sample, while the remaining dimension is m/z-value information. In the case of handling mass spectrum data at three-dimensional micro positions inside a three-dimensional sample, n equals four and there are four dimensions, of which three dimensions are position information in three different directions in the sample, while the remaining dimension is m/z-value information.

When the technique of the instrumental analysis is Raman spectroscopic imaging or FTIR imaging, n equals three and there are three dimensions, of which two dimensions are position information in two different directions on a sample, while the remaining dimension is the information of wavelength or wavenumber.

When the technique of the instrumental analysis is a type of chromatograph mass spectrometry, such as liquid chromatograph mass spectrometry or gas chromatograph mass spectrometry, n equals two and there are two dimensions, of which one dimension is time, while the other dimension is m/z-value information.

When the technique of the instrumental analysis is a comprehensive two-dimensional chromatography (GC×GC or LC×LC) as described in Non Patent Literature 3, n equals two and there are two dimensions, both of which are time information.

When the technique of the instrumental analysis is liquid chromatograph ion mobility spectrometry mass spectrometry (LC-IMS-MS) as described in Non Patent Literature 4, n equals three and there are three dimensions, of which one dimension is time, another dimension is ion mobility, and the remaining dimension is m/z-value information.

A "plurality of samples" in the present context may naturally mean a plurality of samples collected from different individuals, or they may be a plurality of samples collected from different sites in the same individual. They may also be a plurality of samples which have been derived from one specific sample and have gained different physical or chemical natures through different kinds of treatments or processing.

[Configuration and Operation of Device According to Embodiment]

An embodiment of the data-analyzing method for instrumental analysis, data-analyzing device for instrumental analysis and sample analyzer according to the present invention is hereinafter described.

In the following descriptions, an imaging mass spectrometer is taken as an example of the sample analyzer. Actually, the present invention can be applied in a wider range of sample analyzers, as will be described later.

FIG. 1 is a schematic block configuration diagram of the imaging mass spectrometer according to the present embodiment.

As shown in FIG. 1, this imaging mass spectrometer includes an imaging mass spectrometry unit 1, data-processing unit 2, operation unit 3 and display unit 4.

As an example of the imaging mass spectrometry unit 1, an atmospheric pressure MALDI ion trap time-of-flight mass spectrometer as disclosed in Patent Literature 1 can be used, although the ionization method and mass separation technique are not limited to this example. As another possibility, the imaging mass spectrometry unit 1 may be a system as disclosed in Patent Literature 2 in which a laser microdissection device is combined with a mass spectrometer for performing a mass spectrometric analysis of a specimen prepared from an extremely small piece of sample taken from the original sample by means of the laser microdissection device.

The data-processing unit 2 includes, as its functional blocks, a data storage section 20, imaging graphic creator 21, persistent homology processor 22, bottleneck distance calculator 23, m/z-values narrower 24, singular plot extractor 25, back analysis processor 26 and display processor 27. This data-processing unit 2 corresponds to the data-analyzing device according to the present invention and carries out the data-analyzing method according to the present invention.

In the imaging mass spectrometer according to the present embodiment, the data-processing unit 2 can be configured by using, as a hardware resource, a personal computer (or more sophisticated computer) including a CPU, RAM, ROM and other components, with at least some of its functions realized by executing, on this computer, a piece of data-processing software (computer program) installed on the same computer. In that case, the operation unit 3 includes a keyboard and a pointing device (e.g., mouse) included in the computer, while the display unit 4 is a display monitor.

The computer program can be offered to users in the form of a non-transitory computer-readable record medium holding the program, such as a CD-ROM, DVD-ROM, memory card, or USB memory (dongle). The program may also be offered to users in the form of data transferred through the Internet or similar communication networks. The program can also be preinstalled on a computer (or more exactly, on a storage device as a component of a computer) as a part of a system before a user purchases the system.

The computer program may be provided as a single software package including all of its components, or it may consist of a plurality of individual software products. In the latter case, existing software products commonly available for free or for profit can be used as some of the components of the program.

Figure 2:
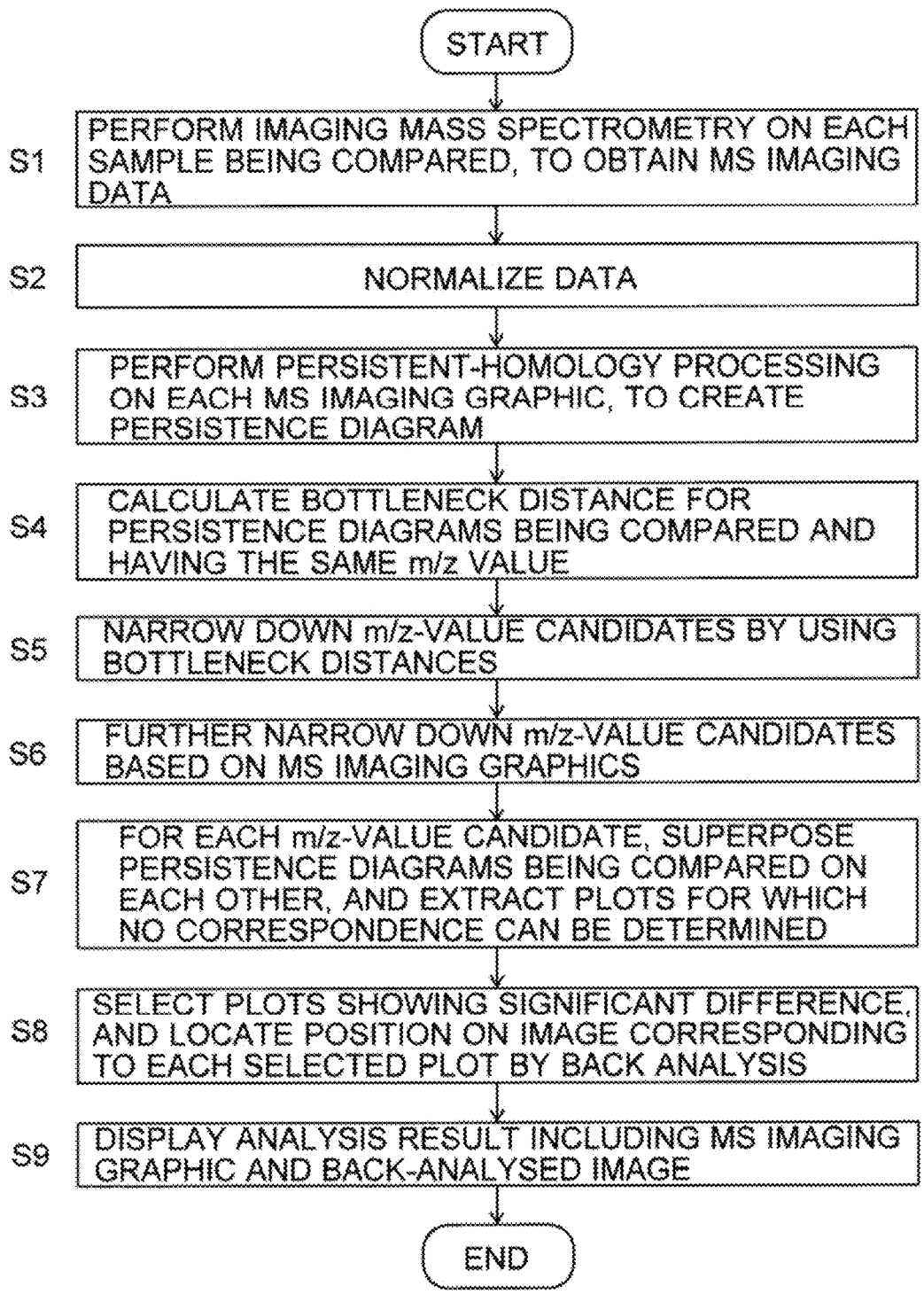
FIG. 2 is a flowchart showing one example of the procedure of an analytical processing in the imaging mass spectrometer according to the present embodiment.

A characteristic analysis in the imaging mass spectrometer according to the present embodiment is hereinafter described with reference to FIG. 2 and other figures. FIG. 2 is a flowchart showing one example of the procedure of an analytical processing in the imaging mass spectrometer according to the present embodiment.

The following descriptions deal with the example of a differential analysis in which biological tissue sections of two types of experimental animals, one of which is a wild type (which may hereinafter be denoted by "WT") and the other is a genetically modified type (which may hereinafter be denoted by "KO"), are taken as samples and compared with each other.

A sample to be subjected to the measurement is placed on a sample plate by a user. After a matrix for MALDI has been applied (or vapor-deposited) to the surface of the sample, the sample plate is set at a predetermined position in the imaging mass spectrometry unit 1. The imaging mass spectrometry unit 1 performs a mass spectrometric analysis on each of the micro areas arranged in a fine grid-like form covering a predetermined measurement area having a two-dimensionally stretched form on the sample, to obtain mass spectrum data over a predetermined range of m/z values (Step S1).

A specific description is as follows: In the imaging mass spectrometry unit 1, one of the micro areas within the measurement area on the sample is irradiated with laser light for a short period of time to generate ions from various compounds which are present within the micro area. The various ions thus generated are temporarily held within an ion trap and ejected from the ion trap into a time-of-flight mass separator at a predetermined timing, to be separated from each other according to their m/z values and be ultimately detected. The imaging mass spectrometry unit 1 repeatedly performs the mass spectrometric operation described so far, while changing the position of the sample in a stepwise manner so that the point of irradiation with the laser light on the sample is gradually shifted, until mass spectrum data at all micro areas defined within the measurement area (MS imaging data) are collected.

After the measurement for one sample has been completed, the sample is replaced with a new one by the user. The imaging mass spectrometry unit 1 collects MS imaging data for the predetermined measurement area on the new sample by the previously described procedure. The measurement is performed in this manner for all prepared samples.

The sets of mass spectrum data respectively collected from the micro areas for each sample, i.e., the MS imaging data for the entire measurement area, are sent from the imaging mass spectrometry unit 1 to the data-processing unit 2 and stored in the data storage section 20. As shown by diagram (A) in FIG. 3, MS imaging data for one sample is a set of signal-value data having a three-dimensional array structure including two parameters representing the information of the positions in the x and y axis directions orthogonal to each other on the sample as well as one parameter representing the m/z value. Thus, the MS imaging data for one sample in the present example corresponds to a "data group including signal values having an n-dimensional array structure" in the present invention. It should be noted that the WT sample, which is one of the two types of samples in the present embodiment, is subjected to the measurement (imaging mass spectrometry) two times, and one set of MS imaging data is collected each time. The reason will be explained later.

The mass spectrometric analysis performed in the imaging mass spectrometry unit 1 does not need to be a normal mass spectrometric analysis. It is also possible to acquire product ion spectrum data by performing an MS/MS analysis or $MS^n$ analysis with n being equal to or larger than three in which an ion having a specific m/z value or falling within a specific m/z-value range is selected as a precursor ion. Even in that case, the data to be collected are signal-value data having a three-dimensional array structure.

At an appropriate point in time, the user issues a command through the operation unit 3 to execute an analysis, whereupon the persistent homology processor 22 retrieves, from the data storage section 20, the sets of MS imaging data respectively obtained for the plurality of samples to be analyzed. Then, the persistent homology processor 22 initially performs a data-normalizing process as a portion of the data preprocessing (Step S2).

In the MALDI ion source, the efficiency of the generation of the ions originating from sample components easily varies depending on the condition of the matrix formed on the sample surface, which may possibly cause a variation in the ion detection sensitivity. Accordingly, the normalizing process is performed for each sample in such a manner that the intensity of an ion at an m/z value corresponding to a compound originating from the matrix, which can be assumed to be almost uniformly detected over the entire measurement area, is used as the reference for normalizing the intensities of the ions at the other m/z values. The m/z value to be used as the reference may be previously set, or it may be determined after the measurement has been carried out. The normalization of the data reduces the influence of the variation of the ion intensity from one sample to another. The processing in Step S2 may be omitted when the influence of the variation of the ion intensity from one sample to another is ignorable, as in the case where the matrix can be applied to the sample in a highly reproducible manner.

Subsequently, for each sample, the persistent homology processor 22 performs a persistent-homology processing on the data constituting an MS imaging graphic at each m/z value and creates a persistence diagram (Step S3).

Persistent homology is a technique of topological data analysis and is described in detail in various documents, including Non Patent Literatures 1 and 2. Many computer programs for performing the calculation of the persistent homology have been commonly known and readily available. Therefore, detailed descriptions of the technique will be omitted. Simply put, persistent homology is a technique for quantitatively extracting information concerning the shape of the data as a feature quantity, paying attention to structural elements, such as connected components, holes or cavities in a figure within a two-dimensional or three-dimensional space. In the present example, one persistence diagram with the two axes representing the birth radius (or birth time) and the death radius (or death time) of the holes is created for each MS imaging graphic by performing the persistent-homology processing on the data of a two-dimensional array structure constituting the MS imaging graphic.

Figure 4:
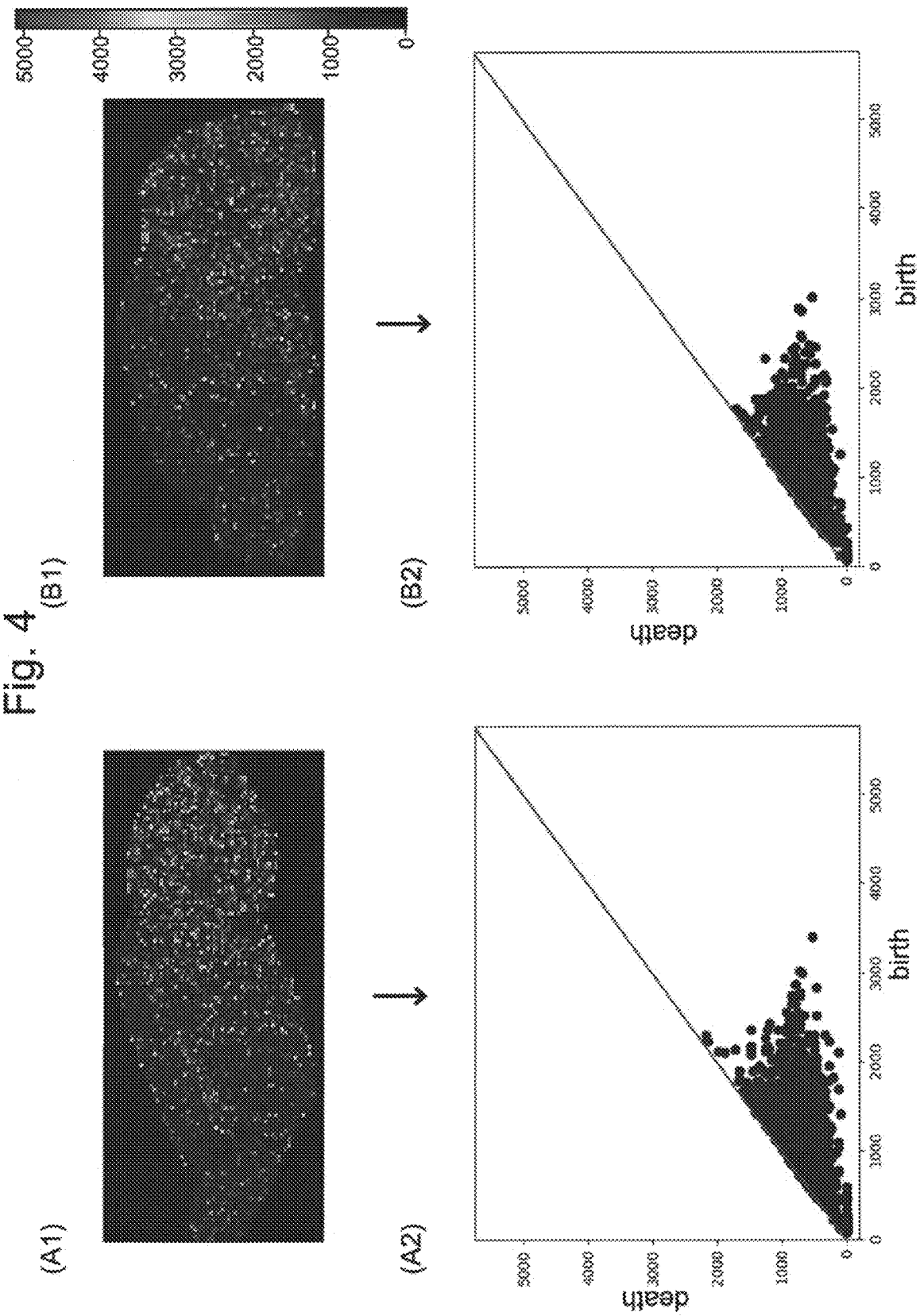
FIG. 4 shows one example of the MS imaging graphics (A1) and (B1) for two samples having different shapes as well as persistence diagrams (A2) and (B2) respectively calculated from those graphics.

FIG. 4 shows an example of the MS imaging graphics (A1) and (B1) at the same m/z value (m/z 702.5) for two WT samples having different shapes as well as the persistence diagrams (A2) and (B2) calculated from the data constituting those MS imaging graphics. One plot on a persistence diagram normally corresponds to one data point (pixel) on an MS imaging graphic.

As can be seen in (A1) and (B1) of FIG. 4, the original section samples are considerably different in shape. However, as shown in (A2) and (B2) of FIG. 4, the dispersion state of the plots on the two persistence diagrams are considerably similar to each other. Here, the similarity P calculated by the following equation (1) is used as the index representing the similarity in the dispersion state of the plots between two persistence diagrams:

$$P = 1/(1+d_B) \ldots \quad (1)$$

where $d_B$ is a bottleneck distance calculated by using equation (2), which will be explained later, based on pairs of plots on the two persistence diagrams being compared.

The similarity P given by equation (1) has a value of 1 when the two persistence diagrams being compared completely match with each other. The higher the similarity of the two persistence diagrams is, the closer to 1 the value of P is. The similarity of the persistence diagrams (A2) and (B2) shown in FIG. 4 is equal to or higher than 0.9, which means that they are considerably similar to each other. The present inventors conducted similar comparative analyses on a number of section samples other than the example of FIG. 4. In many cases, the similarity was equal to or higher than 0.8. This result can be interpreted as confirming that a persistence diagram represents the distribution state of an ion, or that of a compound, on a sample with a high level of accuracy, without being substantially affected by the difference in the shape of the original section samples.

Figure 3:
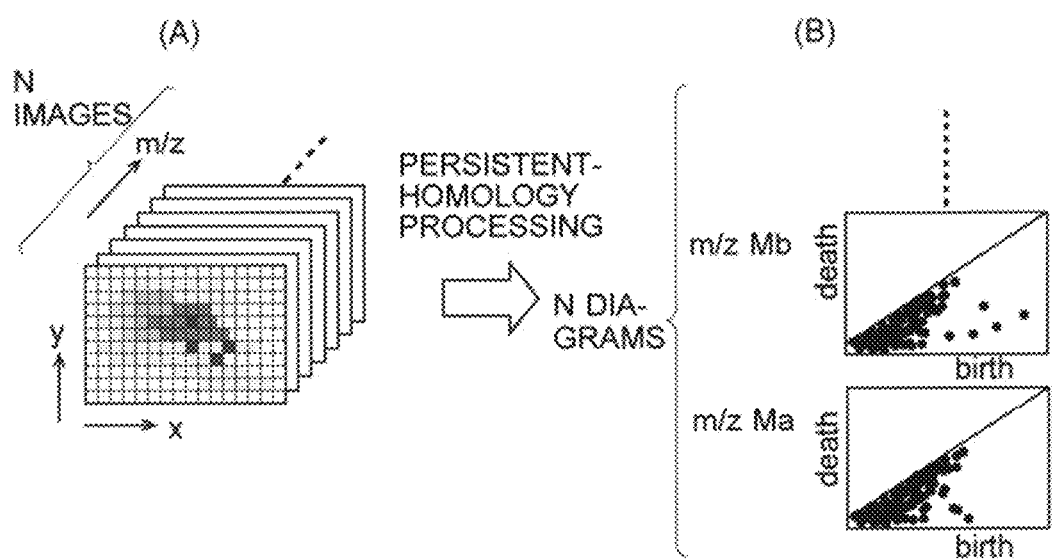
FIG. 3 is a model diagram showing the relationship between data and persistence diagrams obtained in the imaging mass spectrometer according to the present embodiment.

In Step S3, for each of all samples to be analyzed, one persistence diagram is obtained for each MS imaging graphic at one m/z value. As shown in FIG. 3, when there are MS imaging graphics at N m/z values for one sample, the number of persistence diagrams to be obtained is also N. In many cases, MS imaging graphics at hundreds or thousands of m/z values are obtained per one sample. Accordingly, the number of persistence diagrams to be created is also huge.

Subsequently, the bottleneck distance calculator 23 calculates the bottleneck distance between the plurality of persistence diagrams corresponding to each m/z value in order to extract, from the huge number of m/z values, candidates of the m/z value at which a characteristic change is possibly present between the WT and KO samples (Step S4).

The bottleneck distance is, as described in Non Patent Literature 2, one of the indices commonly known as a distance between two persistence diagrams. It is expressed by the following equation (2):

$$W_\infty(X, Y) = \inf_{\eta: X \to Y} \sup_{x \in X} \|x - \eta(x)\|_\infty \quad (2)$$

The technical meaning of equation (2) is as follows: From each of the plots common to the two persistence diagrams, or from each plot in each persistence diagram, a perpendicular is drawn to the diagonal line expressed by y=x. Mapping η is defined which relates the plots to the coordinate of their respective corresponding points of intersection with the diagonal line. The upper-limit value of the difference in x or y coordinate between the plot and its intersection point is calculated for each correspondence pattern. Among the correspondence patterns thus determined, the correspondence pattern which gives the lower limit of the upper-limit value calculated as just described is detected as the best correspondence pattern. This lower limit is the bottleneck distance. In practice, the calculation of the bottleneck distance can be easily implemented even without the understanding of the technical meaning of the bottleneck distance, since existing software applications are available, such as GUDHI (https://gudhi.inria.fr) which is one of the python libraries.

The larger the difference in the dispersion state of the plots between the two persistence diagrams is, the larger the bottleneck distance is. Accordingly, using the bottleneck distance calculated for each pair of persistence diagrams, the m/z-values narrower 24 extracts m/z values which are possibly useful for the differential analysis between the WT and KO samples from the huge number of m/z values (Step S5).

However, whether a bottleneck distance calculated between one persistence diagram for the WT sample and one persistence diagram for the KO sample is large or small cannot be easily determined by simply comparing it with other bottleneck distances, since there is the influence of the variation (reproducibility) of the measurement for the same sample. Accordingly, in the present embodiment, two kinds of bottleneck distances are calculated, i.e., a bottleneck distance between two persistence diagrams created from two sets of MS imaging data respectively obtained by two measurements for the WT sample, and a bottleneck distance between one persistence diagram for the WT sample and one persistence diagram for the KO sample. For each m/z value, the two bottleneck distances are compared, and an m/z value at which the latter bottleneck distance is larger than the former by an amount equal to or larger than a predetermined threshold is extracted as a candidate of the m/z value at which a significant change is present on the KO sample.

After the m/z values have been narrowed down in Step S5, the m/z-values narrower 24 further narrows down the m/z values by using the MS imaging graphics created by the imaging graphic creator 21 based on the MS imaging data at the m/z values extracted in Step S5 (Step S6). As a specific example, whether or not there is an MS imaging graphic in which there is practically no sample (biological tissue) and only the ion intensities originating from the matrix are detected can be determined based on the MS imaging graphics, and on an optical microscope image as need. If such an MS imaging graphic has been found, the m/z value corresponding to that MS imaging graphic can be excluded from the candidates. It should be noted that this processing in Step S6 can be omitted.

By the processing from Steps S1 through S6, one or more candidates of the m/z value at which it is most likely that a distinct difference in the distribution of a specific kind of compound is present between the WT and KO samples can be extracted from a huge number of m/z values. The following processing is the visualization, on the MS imaging graphic, of the sites on the sample at which there is a distinct difference in the distribution of the compound in question between the WT and KO samples.

That is to say, for each m/z value extracted as a candidate, the singular plot extractor 25 superposes two persistence diagrams to be compared, i.e., the persistence diagram for WT sample and the one for the KO sample, in such a manner that their respective horizontal and vertical axes coincide with each other. Then, the singular plot extractor 25 successively creates pairs of plots by relating one plot on one persistence diagram to one plot on the other persistence diagram so that the two plots form the closest pair among the still unpaired plots. Each plot for which no pair could be formed is extracted as a singular plot specific to either the WT or KO sample (Step S7).

When superposing two persistence diagrams on each other in the previously described manner, it is normally reasonable to assume that a plot having a large difference between the birth and death values on the persistence diagram represents an important nature. Accordingly, the back analysis processor 26 performs a back analysis related to the persistent-homology processing for all singular plots extracted in Step S7 or for each plot selected from those singular plots as a plot having a larger difference between the birth and death values than a predetermined value.

By this back analysis, which site (micro area) on the MS imaging graphic corresponds to the plot selected on the persistence diagram can be determined. Accordingly, by the back analysis, it is possible to determine the site on the MS imaging graphic which corresponds to a singular plot on the persistence diagram for the WT sample as well as the site on the MS imaging graphic which corresponds to a singular plot on the persistence diagram for the KO sample (Step S8).

The display processor 27 displays the analysis result on the screen of the display unit 4, where the analysis result includes the MS imaging graphics at the candidates of the characteristic m/z value extracted in Steps S5 and S6 as well as the back-analyzed image showing the sites on the sample located in Step S8 (Step S9). This analysis result allows the user to visually check the intensity distribution image at an m/z value at which there is a distinct difference in the distribution of a specific kind of compound between the WT and KO samples, as well as the sites on the sample which exhibit a characteristic difference in the intensity distribution image. Needless to say, the analysis result thus displayed may additionally include the persistence diagrams corresponding to each MS imaging graphic and/or the persistence diagrams superposed on each other at the same m/z value.

In some cases, simply displaying useful m/z values for the differential analysis may be sufficient. In that case, after the candidates of the m/z value at which there is a characteristic difference between the samples being compared have been obtained in Steps S5 and S6, the display processor 27 may display a list of those m/z-value candidates on the display unit 4.

MEASUREMENT EXAMPLE

An actual example of the measurement according to the previously described analytical technique is hereinafter shown.

The section samples used in the actual measurement were sections of the brain of a mouse. The KO sample was a so-called Scrapper-KO (hereinafter abbreviated as the "SCR-KO") mouse in which the SCRAPPER protein, which is one of the proteins involved in the regulation of the synaptic transmission, had been knocked out. It has been commonly known that an excessive amount of neurotransmitter is released in the brain of SCR-KO mice, which produces a fatal effect on many individual mice, while causing nerve degeneration (or other alterations) in the surviving individual mice.

The primary conditions of the imaging mass spectrometric analysis were as follows:
Matrix: 9-Aminoacridine
Ionization Mode: Negative ionization mode
m/z Range: m/z 600-1000

The imaging mass spectrometric analysis was performed on a section sample of the brain taken from each of the SCR-KO and WT mice, whereby MS imaging data for 14744 m/z values were obtained. The MS imaging graphics which have been shown in FIG. 4 and already explained were prepared from a portion of the MS imaging data thus obtained. The persistent-homology processing as described earlier was performed on the thus collected MS imaging data, and the bottleneck distance between the persistence diagrams obtained by the processing was calculated by the previously described procedure.

Figure 5:
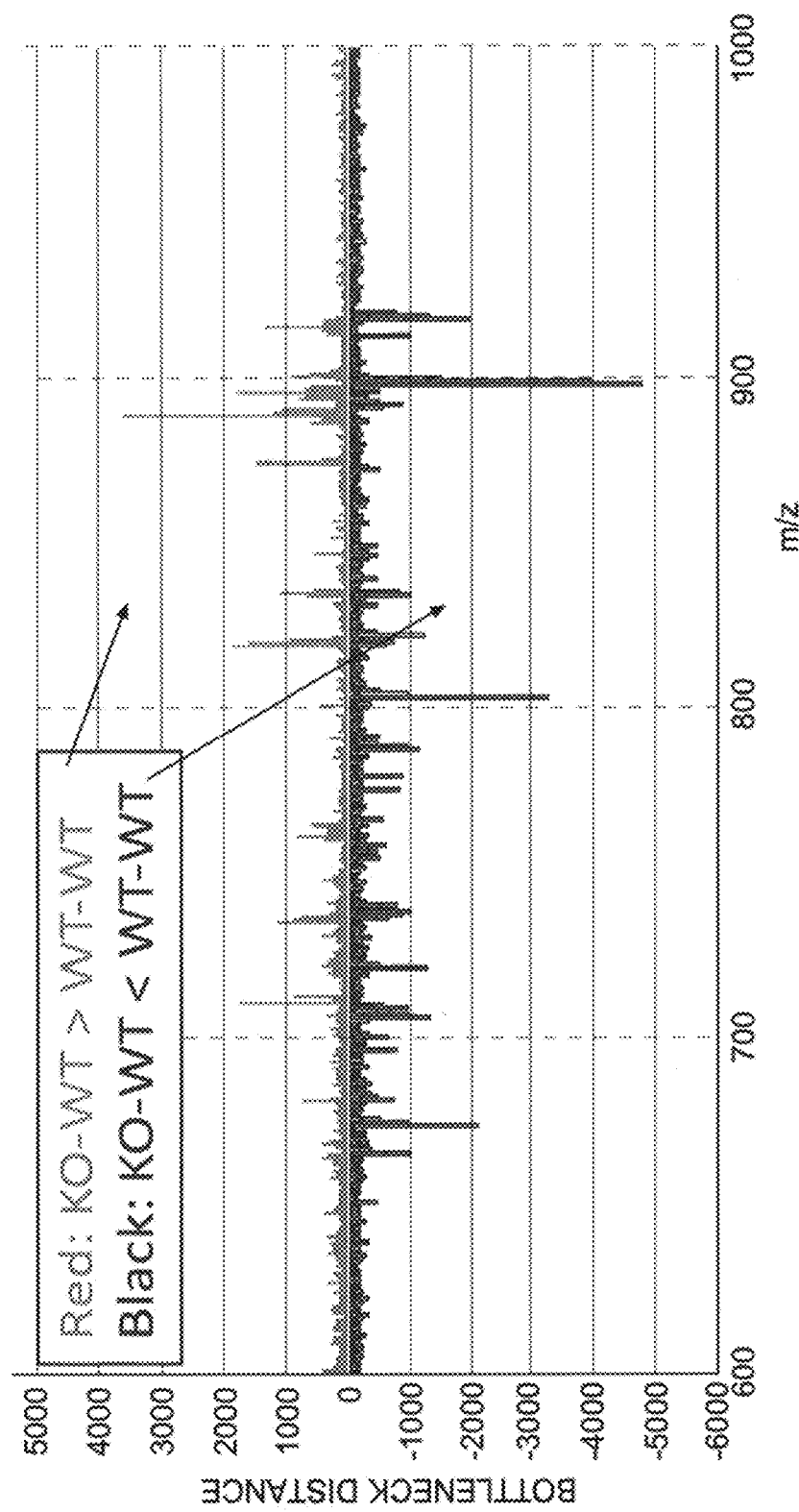
FIG. 5 is a diagram showing an example of the bottleneck distance calculated for each m/z value.

FIG. 5 is a bar chart showing the difference between the following two bottleneck distances for each m/z value: the bottleneck distance between the persistence diagrams in the pair of the SCR-KO and WT mice ("KO-WT pair"), and the bottleneck distance between the persistence diagrams in the pair of the WT and WT mice ("WT-WT pair", which is actually the results of two measurements performed on the same WT mouse). An m/z value at which there is a large difference between the two bottleneck distances is most likely to be a characteristic m/z value. Accordingly, from among those m/z values, each m/z value was extracted as a candidate of the useful m/z value for the differential analysis if the m/z value satisfied the following conditions: the bottleneck distance of the KO-WT pair at the m/z value should be larger than that of the WT-WT pair by an amount equal to or larger than 300, and the ion intensity at the m/z value should have originated from the section sample of the brain rather than the matrix area on the sample plate. Consequently, the m/z-value candidates were narrowed down to 50.

FIG. 6 shows MS imaging graphics at m/z 863.6, which is one of the m/z values extracted in the previously described manner, and the persistence diagrams corresponding to those graphics. This is an example of the case where the increase in the amount of compound primarily occurred at around the midbrain, pons, medulla oblongata, hypothalamus, cerebral cortex and olfactory bulb of the mouse due to the SCR-KO.

A comparison of the MS imaging graphics (A1) and (B1) in FIG. 6 shows that the SCR-KO mouse has considerably higher luminance at around the midbrain, pons, medulla oblongata, cerebellum, cerebral cortex and olfactory bulb than the WT mouse. The areas with luminance values equal to or higher than 3000 have noticeably increased. This change is reflected in the persistence diagrams (A2) and (B2) in FIG. 6, which shows that there are only a small number of plots with birth values equal to or higher than 3000 on the persistence diagram for the WT mouse, while the number of plots with birth values equal to or higher than 3000 on the persistence diagram for the SCR-KO mouse is considerably larger than that of the plots on the persistence diagram for the WT mouse.

Figure 7:
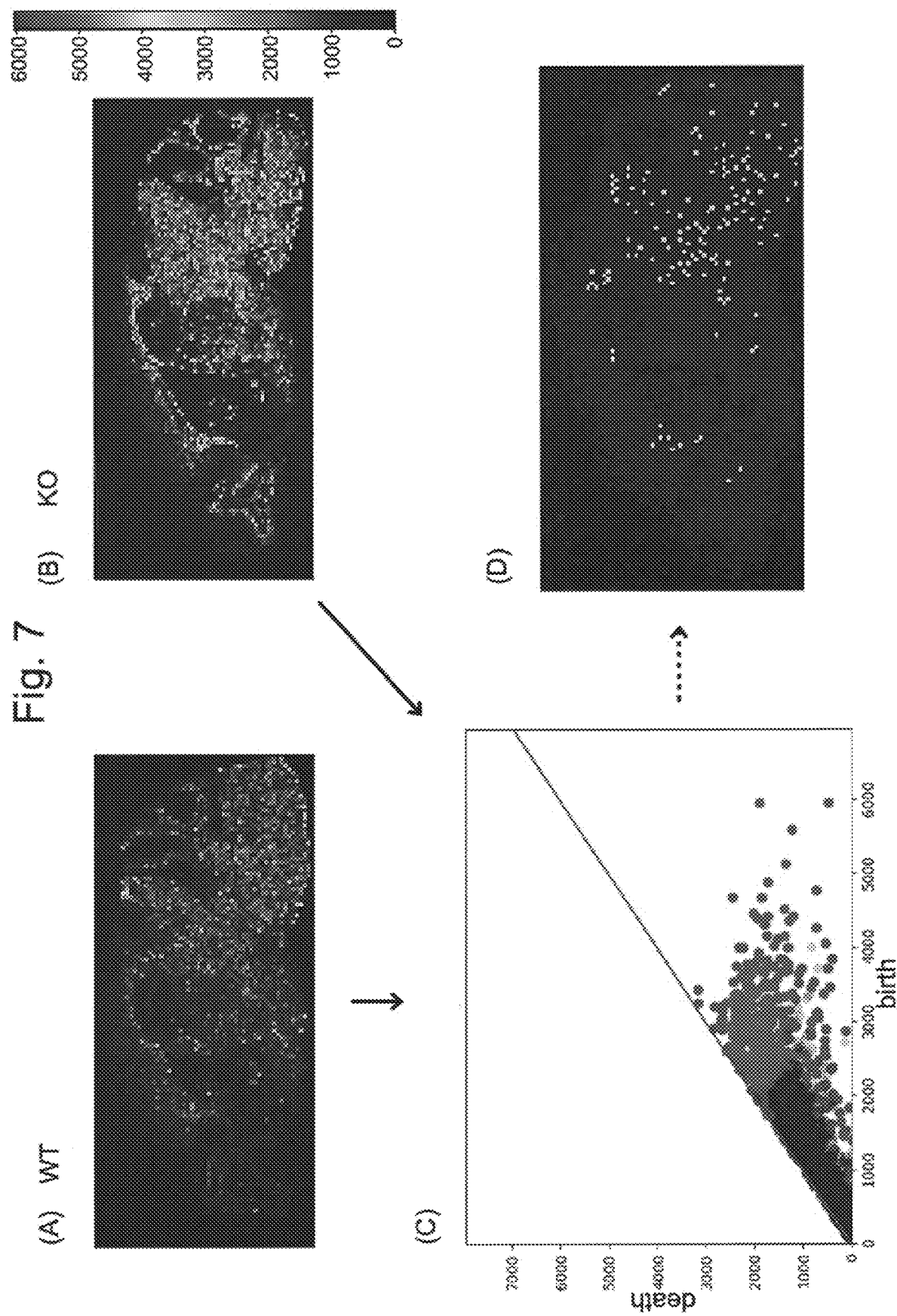
FIG. 7 show an example of the MS imaging graphics (A1) and (B1) for a wild-type (WT) sample and a genetically modified (KO) sample, a diagram (C) showing the state of correspondence of the plots on the persistence diagrams corresponding to those graphics, as well as an imaging graphic (D) showing characteristic sites located by a back analysis based on the plots having no corresponding plot on the persistence diagrams.

FIG. 7 shows the result of the back analysis based on the persistence diagrams shown in FIG. 6. Graphics (A) and (B) in FIG. 7 are identical to graphics (A1) and (B1) in FIG. 6. Diagram (C) in FIG. 7 shows the superposition of the persistence diagrams (A2) and (B2) in FIG. 6 as well as the result of the determination of the correspondence of the plots. In diagram (C) in FIG. 7, different plot colors are used to represent three kinds of plots: (1) plots matching with each other on the persistence diagram for the WT mouse and the persistence diagram for the SCR-KO mouse (so that their correspondence can be determined), (2) plots which are present on only the persistence diagram for the WT mouse, and (3) plots which are present on only the persistence diagram for the SCR-KO mouse. Graphic (D) in FIG. 7 is an imaging graphic created by subtracting the persistence diagram for the WT mouse from the persistence diagram for the SCR-KO mouse and then performing the back analysis on the remaining plots to locate the corresponding micro areas, which are indicated by the high-luminance dots. Tracking the locations on the sample of those sites shown in high luminance confirmed that they were located at around the midbrain, pons, medulla oblongata, hypothalamus, cerebral cortex, olfactory bulb and cerebellum.

From the previously described measurement results, it is possible to infer that the abundance of the compound molecule with a mass-to-charge ratio of m/z 863.6 noticeably increases due to the SCR-KO, and this change particularly strongly occurs at around the midbrain, pons, medulla oblongata, hypothalamus, cerebral cortex, olfactory bulb and cerebellum.

Thus, by the imaging mass spectrometer according to the present embodiment, a characteristic m/z value associated with a difference between samples being compared can be extracted from a huge amount of data collected by imaging mass spectrometry, and the sites in the sample at which the compound having that m/z value noticeably increases or decreases can be located. In particular, even in the case where the section samples are different from each other in shape and/or size, the previously described differential analysis can be performed without being substantially affected by that difference.

Modified Example 1

As noted earlier, persistent homology is applicable to not only signal-value data having a two-dimensional array structure, i.e., image data, but also signal-value data having a three-dimensional array structure, i.e., three-dimensional (three-dimensional image) data. In the previous embodiment, as shown in diagram (A) in FIG. 3, a persistence diagram was created by performing the persistent-homology processing on signal-value data having a two-dimensional array structure with two parameters representing the positions in the x and y axis directions on a sample having a two-dimensionally stretched form. Similarly, the persistent-homology processing can also be performed on signal-value data having a three-dimensional array structure with three parameters representing the positions in the x, y and z axis directions orthogonal to each other in a three-dimensional sample. For example, this type of signal-value data can be obtained by successively slicing off a large number of section samples from a three-dimensional sample in the z axis direction and performing an imaging mass spectrometric analysis in the previously described manner on each of those section samples. By this type of analysis, for example, a characteristic m/z value associated with a difference between three-dimensional samples being compared can be extracted, and spatial positions at which the compound having that m/z value noticeably increases or decreases can be identified.

Modified Example 2

The previous embodiment was an example in which the present invention was applied in imaging mass spectrometry. It is evident that the present invention is generally applicable in the type of device which acquires signal-value data by performing, for example, an optical measurement on each of the micro areas within a two-dimensional measurement area on a sample, or on each of the micro-sized units within a three-dimensional measurement range in a three-dimensional sample. Specifically, for example, in Raman spectroscopic imaging or FTIR imaging, a set of wavelength-resolved (or wavenumber-resolved) signal-value data is obtained for each micro area or micro-sized unit. Therefore, it is easy to conceive the idea of applying the present invention in devices employing these techniques. In this case, the signal-value data obtained through the measurement has a three-dimensional array structure or four-dimensional array structure with the parameters representing the positions in the x and y axis directions on the sample, or in the x, y and z axis directions in the sample, as well as the wavelength or wavenumber. The persistent-homology processing is performed for each wavelength or wavenumber on the signal-value data having the two-dimensional or three-dimensional array structure.

The kinds of parameters in the signal-value data having an n-dimensional array structure are not limited to the position information, m/z value and wavelength (or wavenumber) mentioned so far. Any kind of parameter that can be used as a variable in instrumental analysis may be included in the signal-value data, such as time, energy value, voltage value, current value, temperature and pressure.

Modified Example 3

A liquid chromatograph employing a photodiode detector, wavelength-scanning ultraviolet-visible spectrophotometer or similar device as the detector produces signal-value data having a two-dimensional array structure with time and wavelength as the parameters. Accordingly, a persistence diagram can be created for this type of signal-value data by the persistent-homology processing. By comparing a plurality of persistence diagrams thus obtained from a plurality of different samples, a differential analysis of those samples can be performed.

Modified Example 4

A chromatograph mass spectrometer, such as a liquid chromatograph mass spectrometer or gas chromatograph mass spectrometer, produces signal-value data having a two-dimensional array structure with time and m/z value as the parameters. Accordingly, a persistence diagram can be created for this type of signal-value data by the persistent-homology processing. By comparing a plurality of persistence diagrams thus obtained from a plurality of different samples, a differential analysis of those samples can be performed.

Modified Example 5

A comprehensive two-dimensional liquid chromatograph or comprehensive two-dimensional gas chromatograph produces signal-value data having a two-dimensional array structure with the time in the first dimension and the time in the second dimension as the parameters, as disclosed in FIGS. 1 and 2 of Non Patent Literature 3, for example. Accordingly, a persistence diagram can be created by performing the persistent-homology processing on signal-value data having a two-dimensional array structure in which both of the two parameters represent time. By comparing a plurality of persistence diagrams thus obtained from a plurality of different samples, a differential analysis of those samples can be performed.

Modified Example 6

A system including a liquid chromatograph (LC) or gas chromatograph (GC) coupled with an ion mobility spectrometry mass spectrometer (IMS-MS) produces signal-value data having a three-dimensional array structure which shows a signal value with respect to the three parameters of time, ion mobility (or collision cross section, drift time, etc.) and m/z value. Based on the data, a set of signal-value data having a two-dimensional array structure with time in the first dimension and m/z value in the second dimension as the parameters can be obtained for each ion mobility, as disclosed in FIG. 1 of Non Patent Literature 4, for example. It is also possible to obtain, for each m/z value, a set of signal-value data having a two-dimensional array structure with time in the first dimension and ion mobility in the second dimension as parameters. Accordingly, a persistence diagram can be created for these types of signal-value data by the persistent-homology processing. By comparing a plurality of persistence diagrams thus obtained from a plurality of different samples, an ion mobility or m/z value which shows a characteristic difference between the plurality of samples can be extracted, or a differential analysis between those samples at that ion mobility or m/z value can be performed. A differential analysis between the samples can also be performed by creating a persistence diagram by applying the persistent homology to the signal-value data having a three-dimensional array structure with time, ion mobility and m/z value as the parameters.

Furthermore, in the previously described imaging mass spectrometry, ion mobility mass spectrometry may be performed in place of the simple mass spectrometry. In that case, a piece of signal-value data related to the two parameters of ion mobility (or collision cross section or drift time) and m/z value is acquired for each micro area on the sample. Therefore, a set of signal-value data having a three-dimensional array structure including the m/z value as the third parameter in addition to the two-dimensional position information, or a set of signal-value data having a three-dimensional array structure including the ion mobility as the third parameter in addition to the two-dimensional position information, can be obtained, and the persistent-homology processing can be performed on the set of data. Consequently, a characteristic m/z value associated with a difference between samples being compared can be more accurately extracted, or a characteristic ion mobility value can be extracted.

Advantages in Modified Examples

In the case of imaging mass spectrometry or other optical imaging analysis methods, an advantage exists in that no image-deforming process for making images match with each other in shape and/or size of the sample is required for a differential analysis of biological tissue sections or similar samples, as described earlier. In the cases of the modified examples 3-6, which are not imaging analysis methods, the advantage is essentially the same as in the case of the imaging analysis methods.

That is to say, in any of the modified examples 3-6, time (retention time) is included as a parameter, which is the direction of the separation in the chromatograph. Unlike the m/z value, this "time" is not an intrinsic value of a compound; it is a value observed under specific conditions. Specifically, the retention time changes depending on various separation conditions, including the flow rate (flow velocity) of the mobile phase, temperature and kind of the mobile phase, not to speak of the type of column. Therefore, even when an analysis for a plurality of samples is performed under identical separation conditions, it is often the case that a shift of the retention time occurs from sample to sample due to some factors, such as the fluctuation or variation of the flow rate of the mobile phase. In that case, it has conventionally been necessary to correct the shift of each retention time by a technique of alignment, as described in Non Patent Literature 3, for example, before a comparison of different samples can be performed.

The shift of the retention time is equivalent to a difference in shape of the sample in imaging mass spectrometry when presented on a heat map, contour map or similar chart which graphically shows signal-value data having a two-dimensional array structure with time as one dimension. Therefore, by using the data-analyzing method according to the present invention, an analysis concerning the difference or similarity between a plurality of samples can be performed without correcting the shift of the position of the signal values originating from the same compound due to the shift of the retention time or other factors.

[Correction of Axes in Images to Be Processed]

In an ordinary method of imaging mass spectrometry, the axes of the two-dimensional directions within the measurement area on the sample (the x and y axis directions in diagram (A) in FIG. 3) represent position or length. The numerical accuracies of the two axes are identical or comparable to each other. Accordingly, the MS imaging graphic data (or the like) obtained through an instrumental analysis can be directly subjected to the persistent-homology processing. On the other hand, depending on the type of instrumental analysis, the two axes of the image data to be subjected to the persistent-homology processing may have significantly different numerical accuracies. For example, in the case of the comprehensive two-dimensional liquid chromatograph (or similar devices), although both axes represent time, a comparatively large difference in the numerical accuracy of the retention time may arise between the column of the first dimension and that of the second dimension since the two columns are often significantly different in terms of the stability of the separation (or other aspects). Furthermore, in the case of the chromatograph mass spectrometry or chromatograph ion mobility spectrometry mass spectrometry, the kinds of parameters on the two axes are entirely different, so that the same unit length has entirely different numerical accuracies on these axes. For example, the significance of 1 Da in m/z value is completely different from that of 1 second in retention time. Their numerical accuracies are also different.

In the persistent-homology processing, a hole having a radius with its center at a discrete data point on an image is considered as a structural element. Therefore, if there is a considerable difference in accuracy of the axial length between the two axes, the accuracy of the persistence diagram itself may become low. Accordingly, in the data-analyzing method according to one modified example of the present invention, the correspondence relationship between the unit length in the axial direction and the numerical range of the parameter value in each of the two axes on the image to be processed should preferably be appropriately adjusted according to necessity before the persistent-homology processing is applied.

Figure 8:
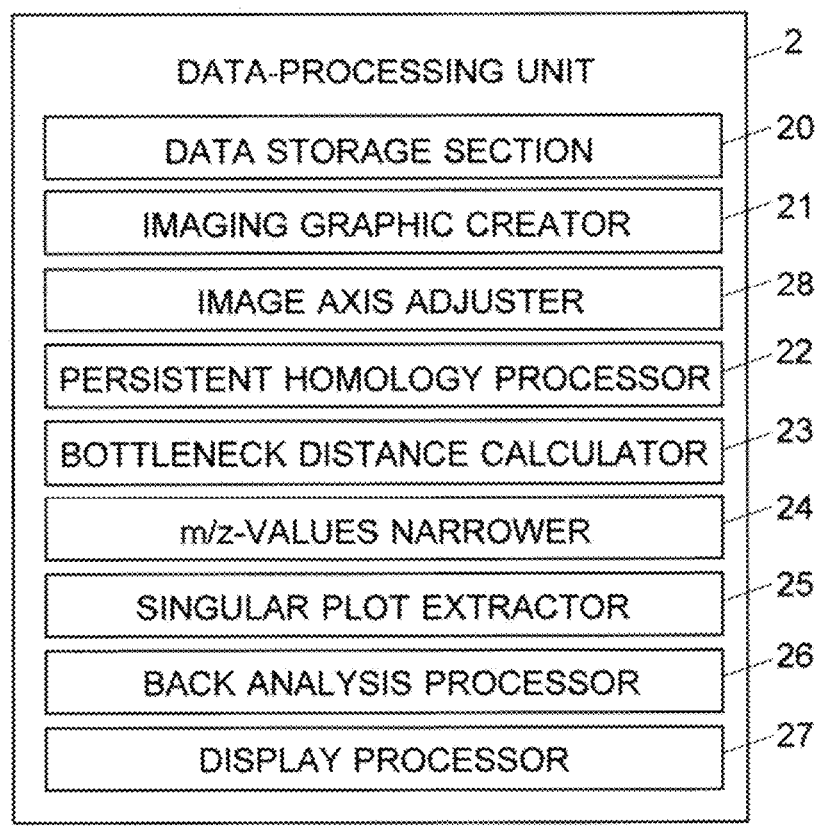
FIG. 8 is a schematic block configuration diagram of a data-processing unit in a modified example of the sample analyzer according to the present invention.

FIG. 8 is a schematic block configuration diagram of the data-processing unit 2 in a sample analyzer as one modified example of the present invention. The difference from FIG. 1 exists in that it additionally includes an image axis adjuster 28. For example, by the technique which will be described later, the image axis adjuster 28 adjusts the numerical range corresponding to the unit length in the axial direction in one or both of the two axes on the image data to be subjected to the persistent-homology processing. This effectively means that the entire image is rescaled in one or both of the two axial directions.

Specifically, as in the case of the comprehensive two-dimensional liquid (or gas) chromatograph, when both axes represent retention time, it is preferable to perform the adjustment so that the period of time corresponding to the unit length in the axial direction of each axis on the image is shorter than the interval of time of the measurement of the retention time on each axis. The "unit length" in the present context is a length corresponding to the size in the x or y direction of one micro area on the MS imaging graphic.

On the other hand, as in the case of the chromatograph mass spectrometry or chromatograph ion mobility spectrometry mass spectrometry, when the kinds of parameters on the two axes are entirely different, the persistent-homology processing should preferably be performed on corrected image data obtained through a correction process in which the numerical values on one or both of the axes on the image to be processed are multiplied by an appropriate correction factor so that the two axes become approximately equal to each other in terms of the accuracy of the numerical range corresponding to the unit length in the axial direction. The accuracy of a specific parameter, such as the retention time, m/z value or ion mobility, for a predetermined numerical range (e.g., 1 Da) is previously determined for the device. Therefore, the correction factor can be determined beforehand based on the accuracy of the device to be used for the analysis.

As just described, by appropriately adjusting the axial length of the two axes on an image on which the persistent-homology processing is to be performed, the image itself can be appropriately rescaled in one or both of the two axial directions so that the persistent-homology processing can be properly applied and a persistence diagram which reflects structural features of the image can be obtained. Consequently, the differential analysis between a plurality of images can be performed with a high level of accuracy.

In place of the operation of adjusting the axes on the image to be processed before the persistent-homology processing, a calculation for adjusting the axial length of each axis can be incorporated into the calculation of the persistent-homology processing.

It should be noted that the previously described embodiment and modified examples are mere examples of the present invention. They will be naturally included within the scope of claims of the present application even when an appropriate change, modification or addition is made within the gist of the present invention.

Various Modes

A person skilled in the art can understand that the previously described illustrative embodiment is a specific example of the following modes of the present invention.

(Clause 1) One mode of the data-analyzing method for instrumental analysis according to the present invention is a data-analyzing method for instrumental analysis in which a data analysis based on a plurality of data groups each obtained by performing a predetermined instrumental analysis on each of a plurality of samples, with each of the plurality of data groups including signal values having an n-dimensional array structure (where n is an integer equal to or greater than two), is performed by using a computer, to obtain desired information concerning a difference between the plurality of samples, the method including:
  a computational processing step for performing, in each of the plurality of data groups, a persistent-homology processing on data including signal values having an m-dimensional array structure (where m is an integer equal to or greater than two and equal to or less than n) obtained from one data group, to create a persistence diagram; and
  an analytical processing step for comparing persistence diagrams respectively obtained from the plurality of data groups with each other, to obtain the desired information based on a difference in the dispersion state of plots across the entire persistence diagrams being compared and/or based on information concerning a plot having no positional correspondence determined on the persistence diagrams being compared.

(Clause 2) In the data-analyzing method for instrumental analysis described in Clause 1, the instrumental analysis may be an imaging analysis employing mass spectrometry or optical spectrometry, in which one of the n dimensions (where n is three or four) is a first parameter representing a mass-to-charge ratio, wavelength or wavenumber, and the remaining n−1 dimensions are information representing a two-dimensional or three-dimensional position on or in a sample.

(Clause 3) In the data-analyzing method for instrumental analysis described in Clause 1, the instrumental analysis may include performing a complex analysis including mass spectrometry combined with a different sample-analyzing technique and/or separation technique, in which one of the n dimensions (where n is three or four) is a first parameter representing a mass-to-charge ratio, and the remaining n−1 dimensions include information representing a position in a sample or information representing time.

(Clause 8) One mode of the data-analyzing device for instrumental analysis according to the present invention is a data-analyzing device for instrumental analysis in which an analysis based on a plurality of data groups each obtained by performing a predetermined instrumental analysis on each of a plurality of samples, with each of the plurality of data groups including signal values having an n-dimensional array structure (where n is an integer equal to or greater than two), is performed to obtain desired information concerning a difference between the plurality of samples, the data-analyzing device including:
  a computational processor configured to perform, in each of the plurality of data groups, a persistent-homology processing on data including signal values having an m-dimensional array structure (where m is an integer equal to or greater than two and equal to or less than n) obtained from one data group, to create a persistence diagram; and
  an analytical processor configured to compare persistence diagrams respectively obtained from the plurality of data groups with each other to obtain the desired information based on a difference in the dispersion state of plots across the entire persistence diagrams being compared, and/or information concerning a plot having no positional correspondence determined on the persistence diagrams being compared.

(Clause 9) In the data-analyzing device for instrumental analysis described in Clause 8, the instrumental analysis may be imaging analysis employing mass spectrometry or optical spectrometry, in which one of the n dimensions (where n is three or four) is a first parameter representing a mass-to-charge ratio, wavelength or wavenumber, and the remaining n−1 dimensions are information representing a two-dimensional or three-dimensional position on or in a sample.

(Clause 10) In the data-analyzing device for instrumental analysis described in Clause 8, the instrumental analysis may include performing a complex analysis including mass spectrometry combined with a different sample-analyzing technique and/or separation technique, in which one of the n dimensions (where n is three or four) is a first parameter representing a mass-to-charge ratio, and the remaining n−1 dimensions include information representing a position in a sample or information representing time.

(Clause 15) One mode of the sample analyzer according to the present invention is a sample analyzer employing the data-analyzing device for instrumental analysis described in Clause 8, the sample analyzer further including a measurement executer configured to obtain each of a plurality of data groups by performing a predetermined instrumental analysis on each of a plurality of samples, with each of the plurality of data groups including signal values having an n-dimensional array structure (where n is an integer equal to or greater than two).

(Clause 16) In the sample analyzer described in Clause 15, the measurement executer may be configured to perform an imaging analysis employing mass spectrometry or optical spectrometry so as to obtain the data groups in which one of the n dimensions (where n is three or four) is a first parameter representing a mass-to-charge ratio, wavelength or wavenumber, and the remaining n−1 dimensions are information representing a two-dimensional or three-dimensional position on or in a sample.

The "imaging analysis employing mass spectrometry or optical spectrometry" is an analysis employing the technique of mass spectrometric imaging, Raman spectroscopic imaging, FTIR imaging, or similar imaging method. The "different sample-analyzing technique and/or separation technique" is a technique which is typically combined with mass spectrometry and works effectively. For example, it may be ion mobility spectrometry or chromatography.

By the data-analyzing method for instrumental analysis described in Clause 1, the data-analyzing device for instrumental analysis described in Clause 8, or the sample analyzer described in Clause 15, for example, an analysis concerning a difference between samples, such as an analysis for identifying a compound showing a significant difference in distribution state between the samples or localizing a site showing a significant difference in the abundance of a specific kind of compound, can be efficiently performed with a satisfactory level of accuracy, on MS imaging graphics or Raman spectroscopic imaging graphics respectively obtained from samples that are different from each other in size and/or shape, without requiring an image-deforming process for making the imaging graphics match with each other in size and/or shape of the sample, and without requiring an operator to perform the task of visually comparing the MS imaging graphics.

(Clause 4) In the data-analyzing method for instrumental analysis described in Clause 2, the computational processing step may include creating a persistence diagram for each value of the first parameter, and the analytical processing step may include extracting a value of the first parameter which shows a difference between a plurality of samples, based on a plurality of persistence diagrams having the same value of the first parameter for the plurality of samples.

(Clause 11) Similarly, in the data-analyzing device for instrumental analysis described in Clause 9, the computational processor may be configured to create a persistence diagram for each value of the first parameter, and the analytical processor may be configured to extract a value of the first parameter which shows a difference between a plurality of samples, based on a plurality of persistence diagrams having the same value of the first parameter for the plurality of samples.

For example, in imaging mass spectrometry, one MS imaging graphic is obtained at each m/z value over a predetermined range of m/z values. Therefore, it takes an extremely large amount of time and labor for a user to visually examine MS imaging graphics obtained for a plurality of samples and extract characteristic m/z values. The data-analyzing method for instrumental method described in Clause 4 or the data-analyzing device for instrumental analysis described in Clause 11 can correctly extract m/z values showing a difference in distribution between the samples, while eliminating the cumbersome task by the user. Since no personal judgment by the user is involved, a deterioration in analysis accuracy due to an oversight, incorrect judgment or erroneous operation can be avoided. Furthermore, the analysis can be consistently performed at a constant level of quality without being affected by the variation in the degree of experience or level of skill among the operators taking charge of the task.

(Clause 5) In the data-analyzing method for instrumental analysis described in Clause 4, the plurality of samples may include a sample belonging to a first group and a sample belonging to a second group having a different characteristic from the first group, and the plurality of data groups may include data groups obtained by performing the same instrumental analysis on the sample belonging to the first group two or more times; and the analytical processing step may include extracting a value of the first parameter which shows a difference between the first group and the second group, by comparing, for each value of the first parameter, a bottleneck distance determined between persistence diagrams respectively created based on the plurality of data groups corresponding to the sample belonging to the first group, and a bottleneck distance determined between a persistence diagram created based on a data group corresponding to the sample belonging to the first group and a persistence diagram created based on a data group corresponding to the sample belonging to the second group.

(Clause 12) In the data-analyzing device for instrumental analysis described in Clause 11, the plurality of samples may include a sample belonging to a first group and a sample belonging to a second group having a different characteristic from the first group, and the plurality of data groups may include data groups obtained by performing the same instrumental analysis on the sample belonging to the first group two or more times; and the analytical processor may be configured to extract a value of the first parameter which shows a difference between the first group and the second group, by comparing, for each value of the first parameter, a bottleneck distance determined between persistence diagrams respectively created based on the plurality of data groups corresponding to the sample belonging to the first group, and a bottleneck distance determined between a persistence diagram created based on a data group corresponding to the sample belonging to the first group and a persistence diagram created based on a data group corresponding to the sample belonging to the second group.

The bottleneck distance is a representative index showing the similarity or difference of a plurality of persistence diagrams. In the data-analyzing method for instrumental analysis described in Clause 5 or the data-analyzing device for instrumental analysis described in Clause 12, the difference in the dispersion state of the plots on the persistence diagrams can be evaluated with a high level of accuracy by using this bottleneck distance for the evaluation. This evaluation does not rely on a simple comparison of the bottleneck distance between two persistence diagrams being compared; a bottleneck distance between a plurality of persistence diagrams created based on the results of a plurality of measurements of the same sample is used as the reference for the evaluation of the bottleneck distance. Therefore, the differential analysis on samples can be performed with a high level of accuracy even when the analysis result varies from one analysis to another to a comparatively large extent, as is the case with a mass spectrometer employing a MALDI ion source.

(Clause 6) In the data-analyzing method for instrumental analysis described in one of Clauses 2-5, the analytical processing step may include performing a back analysis based on a plot having no positional correspondence determined on the persistence diagrams being compared, so as to determine information representing a two-dimensional or three-dimensional position on or in a sample corresponding to the plot.

(Clause 13) Similarly, the data-analyzing device for instrumental analysis described in one of Clauses 9-12, the analytical processor may be configured to perform a back analysis based on a plot having no positional correspondence determined on the persistence diagrams being compared, so as to determine information representing a two-dimensional or three-dimensional position on or in a sample corresponding to the plot.

The data-analyzing method for instrumental analysis described in Clause 6 or the data-analyzing device for instrumental analysis described in Clause 13 can locate a site on or in a sample at which there is a significant difference in the abundance of a specific kind of compound between a plurality of samples. Therefore, for example, it is possible to search for a site in a biological tissue at which a compound that noticeably increases due to a specific kind of disease or abnormality is easily accumulated.

(Clause 7) In the data-analyzing method for instrumental analysis described in one of Clauses 2-5, a data adjustment processing step may further be performed, in advance of the computational processing step, on the data including signal values having an m-dimensional array structure obtained from each data group, so as to adjust a numerical range corresponding to a unit length on an axis of at least one of the m dimensions; and the persistent-homology processing by the computational processing step may be performed on the data processed by the data adjustment processing step.

(Clause 4) Similarly, the data-analyzing device for instrumental analysis described in one of Clauses 9-12 may further include an adjustment processor configured to process the data including signal values having an m-dimensional array structure obtained from each data group, so as to adjust a numerical range corresponding to a unit length on an axis of at least one of the m dimensions; and the computational processor may be configured to perform the persistent-homology processing on the data processed by the adjustment processor.

In the data-analyzing method for instrumental analysis described in Clause 7 or the data-analyzing device for instrumental analysis described in Clause 14, even when there is a considerable difference in numerical accuracy between the parameters of the m-dimensional axes of the data including signal values having an m-dimensional array structure on which the persistent-homology processing is to be performed, the plurality of axes can previously be made to roughly match with each other in terms of the numerical accuracy at the unit length of the axes. Consequently, the persistent-homology processing can be properly performed, and highly accurate persistence diagrams can be created.

REFERENCE SIGNS LIST

1 . . . Imaging Mass Spectrometry Unit
2 . . . Data-Processing Unit
20 . . . Data Storage Section
21 . . . Imaging Graphic Creator
22 . . . Persistent Homology Processor
23 . . . Bottleneck Distance Calculator
24 . . . m/z-Values Narrower
25 . . . Singular Plot Extractor
26 . . . Back Analysis Processor
27 . . . Display Processor
28 . . . Image Axis Adjuster
3 . . . Input Unit
4 . . . Display Unit

The invention claimed is:

1. A data-analyzing method for instrumental analysis in which an analysis based on a plurality of data groups each obtained by performing a predetermined instrumental analysis on each of a plurality of samples, with each of the plurality of data groups including signal values having an n-dimensional array structure (where n is an integer equal to or greater than two), is performed by using a computer, to obtain desired information concerning a difference between the plurality of samples, the method comprising:

a computational processing step for performing, in each of the plurality of data groups, a persistent-homology processing on data including signal values having an m-dimensional array structure (where m is an integer equal to or greater than two and equal to or less than n) obtained from one data group, to create a persistence diagram; and an analytical processing step for comparing persistence diagrams respectively obtained from the plurality of data groups with each other, to obtain the desired information based on a difference in a dispersion state of plots across the entire persistence diagrams being compared and/or based on information concerning a plot having no positional correspondence determined on the persistence diagrams being compared;

wherein each of a plurality of data groups are obtained by performing a predetermined instrumental analysis on each of a plurality of samples, with each of the plurality of data groups including signal values having an n-dimensional array structure (where n is an integer equal to or greater than two); and wherein the instrumental analysis is an imaging analysis employing mass spectrometry or optical spectrometry so as to obtain, the data groups including one of the n dimensions (where n is three or four) is a first parameter representing a mass-to-charge ratio, wavelength or wavenumber, and the remaining n−1 dimensions are information representing a two-dimensional or three-dimensional position on or in a sample.

2. The data-analyzing method for instrumental analysis according to claim 1, wherein the instrumental analysis includes performing a complex analysis including mass spectrometry combined with a different sample-analyzing technique and/or separation technique, the first parameter representing the mass-to-charge ratio, and the remaining n−1 dimensions include information representing the position in the sample.

3. The data-analyzing method for instrumental analysis according to claim 1, wherein the computational processing step includes creating a persistence diagram for each value of the first parameter, and the analytical processing step includes extracting a value of the first parameter which shows a difference between a plurality of samples, based on a plurality of persistence diagrams having a same value of the first parameter for the plurality of samples.

4. The data-analyzing method for instrumental analysis according to claim 3, wherein:
the plurality of samples include a sample belonging to a first group and a sample belonging to a second group having a different characteristic from the first group, and the plurality of data groups include data groups obtained by performing a same instrumental analysis on the sample belonging to the first group two or more times; and
the analytical processing step includes extracting a value of the first parameter which shows a difference between the first group and the second group, by comparing, for each value of the first parameter, a bottleneck distance determined between persistence diagrams respectively created based on the plurality of data groups corresponding to the sample belonging to the first group, and a bottleneck distance determined between a persistence diagram created based on a data group corresponding to the sample belonging to the first group and a persistence diagram created based on a data group corresponding to the sample belonging to the second group.

5. The data-analyzing method for instrumental analysis according to claim 1, wherein the analytical processing step includes performing a back analysis based on a plot having no positional correspondence determined on the persistence diagrams being compared, so as to determine information representing a two-dimensional or three-dimensional position on or in a sample corresponding to the plot.

6. The data-analyzing method for instrumental analysis according to claim 1, wherein:
a data adjustment processing step is further performed, in advance of the computational processing step, on the data including signal values having an m-dimensional array structure obtained from each data group, so as to adjust a numerical range corresponding to a unit length on an axis of at least one of the m dimensions; and
the persistent-homology processing by the computational processing step is performed on the data processed by the data adjustment processing step.

7. A data-analyzing device for instrumental analysis in which an analysis based on a plurality of data groups each obtained by performing a predetermined instrumental analysis on each of a plurality of samples, with each of the plurality of data groups including signal values having an n-dimensional array structure (where n is an integer equal to or greater than two), is performed to obtain desired information concerning a difference between the plurality of samples, the data-analyzing device comprising:
a computational processor configured to perform, in each of the plurality of data groups, a persistent-homology processing on data including signal values having an m-dimensional array structure (where m is an integer equal to or greater than two and equal to or less than n) obtained from one data group, to create a persistence diagram; and
an analytical processor configured to compare persistence diagrams respectively obtained from the plurality of data groups with each other to obtain the desired information based on a difference in a dispersion state of plots across the entire persistence diagrams being compared, and/or information concerning a plot having no positional correspondence determined on the persistence diagrams being compared; and
a measurement executer configured to obtain each of a plurality of data groups by performing a predetermined instrumental analysis on each of a plurality of samples, with each of the plurality of data groups including signal values having an n-dimensional array structure (where n is an integer equal to or greater than two);
wherein the measurement executer is configured to perform an imaging analysis employing mass spectrometry or optical spectrometry so as to obtain the data groups in which one of the n dimensions (where n is three or four) is a first parameter representing a mass-to-charge ratio, wavelength or wavenumber, and the remaining n−1 dimensions are information representing a two-dimensional or three-dimensional position on or in a sample.

8. The data-analyzing device for instrumental analysis according to claim 7, wherein the instrumental analysis includes performing a complex analysis including mass spectrometry combined with a different sample-analyzing technique and/or separation technique, the first parameter representing the mass-to-charge ratio, and the remaining n−1 dimensions include information representing the position in the sample.

9. The data-analyzing device for instrumental analysis according to claim 7, wherein the computational processor is configured to create a persistence diagram for each value of the first parameter, and the analytical processor is configured to extract a value of the first parameter which shows a difference between a plurality of samples, based on a plurality of persistence diagrams having a same value of the first parameter for the plurality of samples.

10. The data-analyzing device for instrumental analysis according to claim 9, wherein:
the plurality of samples includes a sample belonging to a first group and a sample belonging to a second group having a different characteristic from the first group, and the plurality of data groups include data groups obtained by performing a same instrumental analysis on the sample belonging to the first group two or more times; and
the analytical processor is configured to extract a value of the first parameter which shows a difference between the first group and the second group, by comparing, for each value of the first parameter, a bottleneck distance determined between persistence diagrams respectively created based on the plurality of data groups corresponding to the sample belonging to the first group, and a bottleneck distance determined between a persistence diagram created based on a data group corresponding to the sample belonging to the first group and a persistence diagram created based on a data group corresponding to the sample belonging to the second group.

11. The data-analyzing device for instrumental analysis according to claim 7, wherein the analytical processor is configured to perform a back analysis based on a plot having no positional correspondence determined on the persistence diagrams being compared, so as to determine information representing a two-dimensional or three-dimensional position on or in a sample corresponding to the plot.

12. The data-analyzing device for instrumental analysis according to claim 7, further comprising an adjustment processor configured to process the data including signal values having an m-dimensional array structure obtained from each data group, so as to adjust a numerical range corresponding to a unit length on an axis of at least one of the m dimensions,
  wherein the computational processor is configured to perform the persistent-homology processing on the data processed by the adjustment processor.

* * * * *